United States Patent [19]
Dorey et al.

[11] Patent Number: 5,341,132
[45] Date of Patent: Aug. 23, 1994

[54] VEHICLE POSITION ALARM APPARATUS

[76] Inventors: Mark K. Dorey; Harrell E. Dorey, both of 1001 Nob Hill Ave., Pinole, Calif. 94564

[21] Appl. No.: 58,149

[22] Filed: May 10, 1993

[51] Int. Cl.$^5$ ............................................. B60Q 1/48
[52] U.S. Cl. .................................. 340/932.2; 340/665; 340/666; 116/202; 116/211
[58] Field of Search .................... 340/932.2, 440, 665, 340/666; 116/33, 202, 211; 70/225

[56] References Cited
U.S. PATENT DOCUMENTS 3,845,261  10/1974  Blinkilde ............................ 200/85 A Primary Examiner—John K. Peng
Assistant Examiner—Daryl C. Pope
Attorney, Agent, or Firm—E. Michael Combs

[57] ABSTRACT

A unitary flexible housing includes a top wall, having first and second contact plates mounted within a housing alarm cavity positioned between the top wall and the bottom wall, wherein a control housing is arranged to effect actuation of an audible alarm upon the first and second contact plates directed in communication relative to one another upon a vehicle directing the contact plates together. A visual alarm is optionally employed. The housing includes a bottom wall, including projecting nodes for effecting a non-skid bottom wall surface.

4 Claims, 5 Drawing Sheets

VEHICLE POSITION ALARM APPARATUS

BACKGROUND OF THE INVENTION

1. Field of the Invention

The field of invention relates to vehicle position alarm apparatus, and more particularly pertains to a new and improved vehicle position alarm apparatus wherein the same is directed for the audible indication of desired positioning of a vehicle within a predetermined parking area.

2. Description of the Prior Art

Vehicle alarm structure of various types have been utilized in the prior art and exemplified by the U.S. Pat. Nos. 4,288,777; 4,965,571; and 4,870,413.

The instant invention attempts to overcome deficiencies of the prior art by providing for a unitary compact structure arranged for ease of positioning relative to a floor surface and in this respect, the present invention substantially fulfills this need.

SUMMARY OF THE INVENTION

In view of the foregoing disadvantages inherent in the known types of vehicle position alarm apparatus now present in the prior art, the present invention provides a vehicle position alarm apparatus wherein the same is directed to the compression of a resilient housing to effect actuation of an audible alarm. As such, the general purpose of the present invention, which will be described subsequently in greater detail, is to provide a new and improved vehicle position alarm apparatus which has all the advantages of the prior art vehicle position alarm apparatus and none of the disadvantages.

To attain this, the present invention provides a unitary flexible housing including a top wall, having first and second contact plates mounted within a housing alarm cavity positioned between the top wall and the bottom wall, wherein a control housing is arranged to effect actuation of an audible alarm upon the first and second contact plates directed in communication relative to one another upon a vehicle directing the contact plates together. A visual alarm is optionally employed. The housing includes a bottom wall, including projecting nodes for effecting a non-skid bottom wall surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle position alarm apparatus which has all the advantages of the prior art vehicle position alarm apparatus and none of the disadvantages.

It is another object of the present invention to provide a new and improved vehicle position alarm apparatus which may be easily and efficiently manufactured and marketed.

It is a further object of the present invention to provide a new and improved vehicle position alarm apparatus which is of a durable and reliable construction.

An even further object of the present invention is to provide a new and improved vehicle position alarm apparatus which is susceptible of a low cost of manufacture with regard to both materials and labor, and which accordingly is then susceptible of low prices of sale to the consuming public, thereby making such vehicle position alarm apparatus economically available to the buying public.

Still yet another object of the present invention is to provide a new and improved vehicle position alarm apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
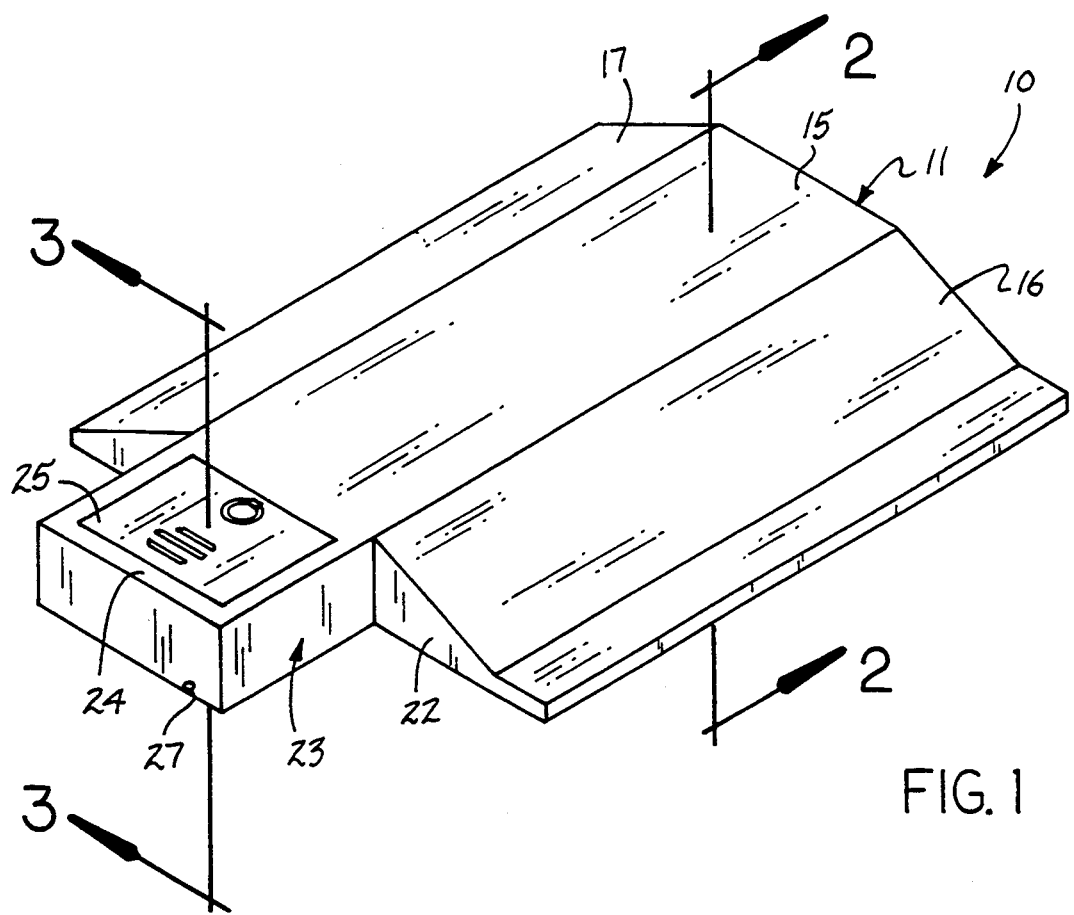
FIG. 1 is an isometric illustration of the invention.
Figure 2:
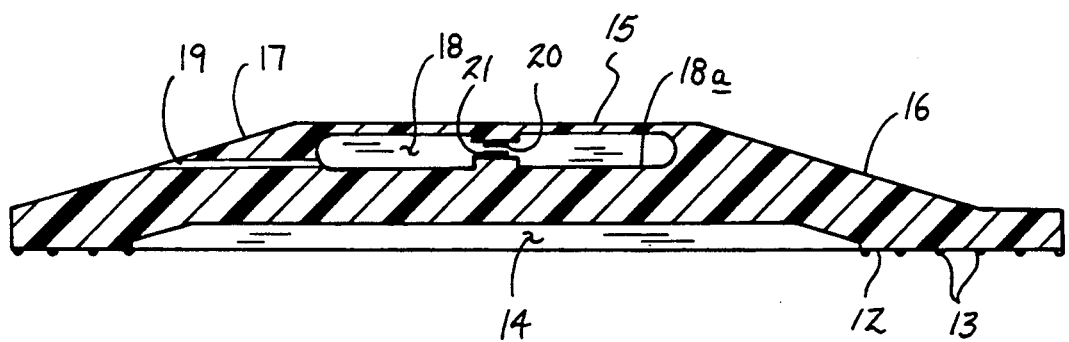
FIG. 2 is an orthographic view, taken along the lines 2—2 of FIG. 1 in the direction indicated by the arrows.

With reference now to the drawings, and in particular to FIGS. 1 to 10 thereof, a new and improved vehicle position alarm apparatus embodying the principles and concepts of the present invention and generally designated by the reference numeral 10 will be described.

Figure 3:
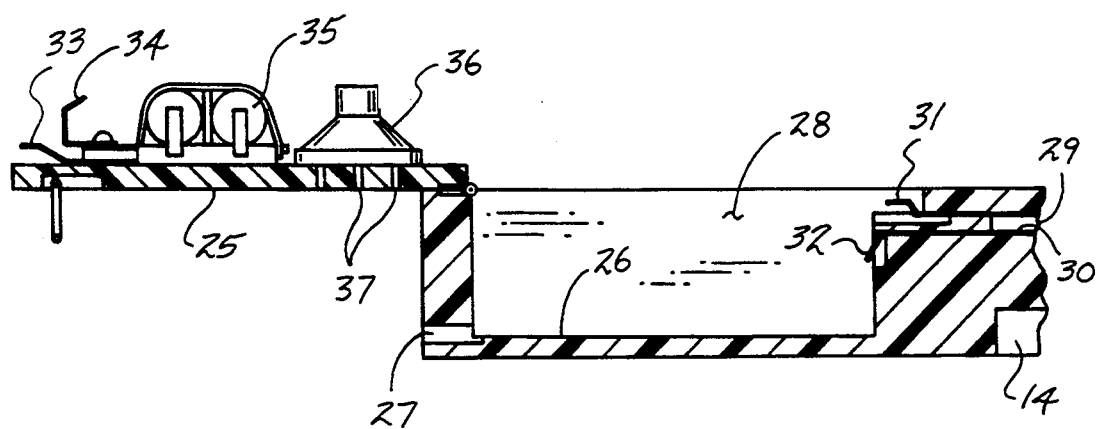
FIG. 3 is an orthographic view, taken along the lines 3—3 of FIG. 1 in the direction indicated by the arrows.
Figure 4:
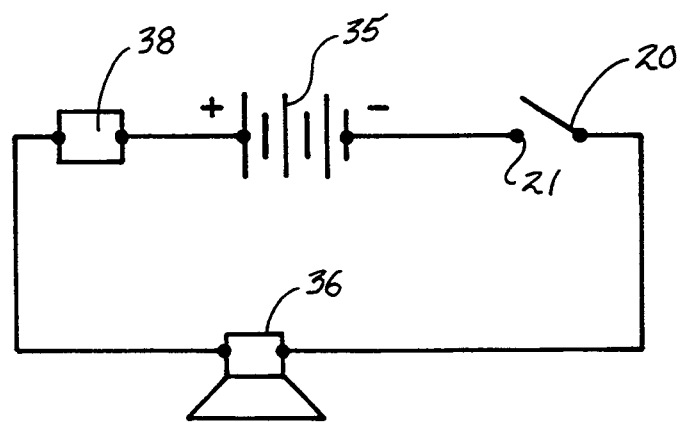
FIG. 4 is a diagrammatic illustration of an electrical circuit arranged for employment by the invention.

More specifically, the vehicle position alarm apparatus 10 of the instant invention essentially comprises a resilient housing 11, having a housing bottom wall 12 that includes a matrix of skid nodes 13 extending therefrom formed of resilient material in the housing 11 to provide for a skid resistant organization when positioned upon a support surface, such as a garage floor, driveway, and the like. The housing 11 is arranged to include a bottom wall recess 14 oriented centrally of the bottom wall 12 to accommodate deflection when a vehicle is directed onto the housing 11, as well as enhancing engagement of the bottom wall to an underlying support surface and accommodating displacement of the housing due to a vehicle tire being directed thereon. First and second top wall ramps 16 and 17 are oriented on opposed sides of a housing central top wall 15 that is arranged parallel relative to the bottom wall 12 and medially over the bottom wall recess 14. An alarm cavity 18 is positioned within the housing in adjacency to and substantially coextensive with the central top wall 15, with the alarm cavity 18 including an exhaust conduit 19 to permit ease of deflection of the top wall 15 relative to the alarm cavity floor 18a when a first electrical contact plate 20 mounted within the alarm cavity 18 and to the central top wall 15 is directed in communication with a second electrical contact plate 21 mounted to the alarm cavity floor 18a. Upon engagement of the first electrical contact plate 20 with the second electrical contact plate 21, a circuit is completed to effect actuation of an audible alarm that is positioned within a control housing 23 projecting from the housing side wall 22, as indicated in FIG. 1 for example. The control housing 23 includes a control housing top wall 24 substantially coplanar with the central top wall 15 such that should a vehicle tire be directed over the control housing top wall 24, a continuous support surface would be provided. The control housing is further arranged to include a lid 25 pivotally mounted relative to the top wall 24 for access to a control housing cavity 28. The control housing includes a control housing floor 26 within the cavity 28 and a floor drain conduit 27 directed from the control housing cavity 28 exteriorly of the control housing, such as indicated in FIG. 3, to take advantage of rain water and the like directed into the control housing about the lid 25. First and second contact plate connecting cables 29 and 30 extend from the respective first and second electrical contact plates 20 and 21 into the control housing cavity terminating in respective first and second connector contact spring fingers 31 and 32 arranged for engagement with the third and fourth connector contact spring fingers 33 and 34 respectively mounted to the control housing lid 25. The third and fourth spring fingers 33 and 34 are in electrical communication with a battery structure 35 and a speaker amplifier 36 mounted to the top wall lid 25, with the speaker amplifiers 36 positioned in adjacency to lid apertures 37 through the control housing lid 25. A time delay disconnect 38 is provided such that the audible alarm effected by contact of the first and second contact plates 20 and 21 is discontinued after a predetermined time interval.

Figure 5:
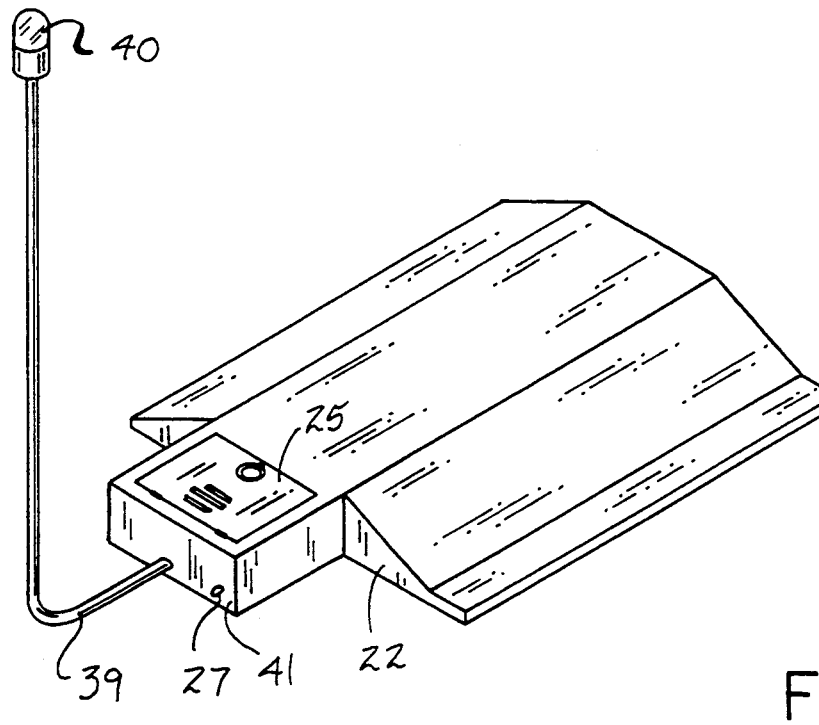
FIG. 5 is an isometric illustration of the invention employing a visual alarm.
Figure 6:
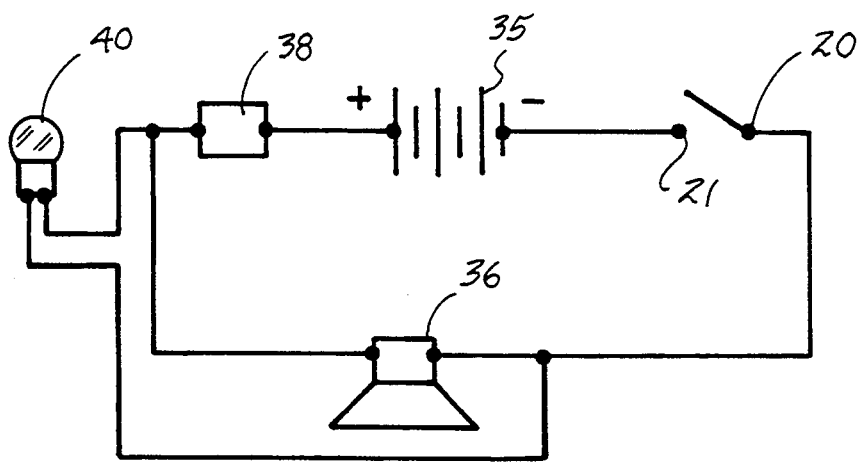
FIG. 6 is a diagrammatic electrical illustration of proposed circuitry for employing the visual alarm.

The FIGS. 5 and 6 indicate the further use of a visual alarm, wherein an L-shaped support rod 39 extends from the control housing end wall 41, with an illumination bulb 40 mounted to an uppermost distal end of the L-shaped support rod 39 that is simultaneously actuated with the actuation of the audible alarm of the speaker and amplifier structure 36.

Figure 7:
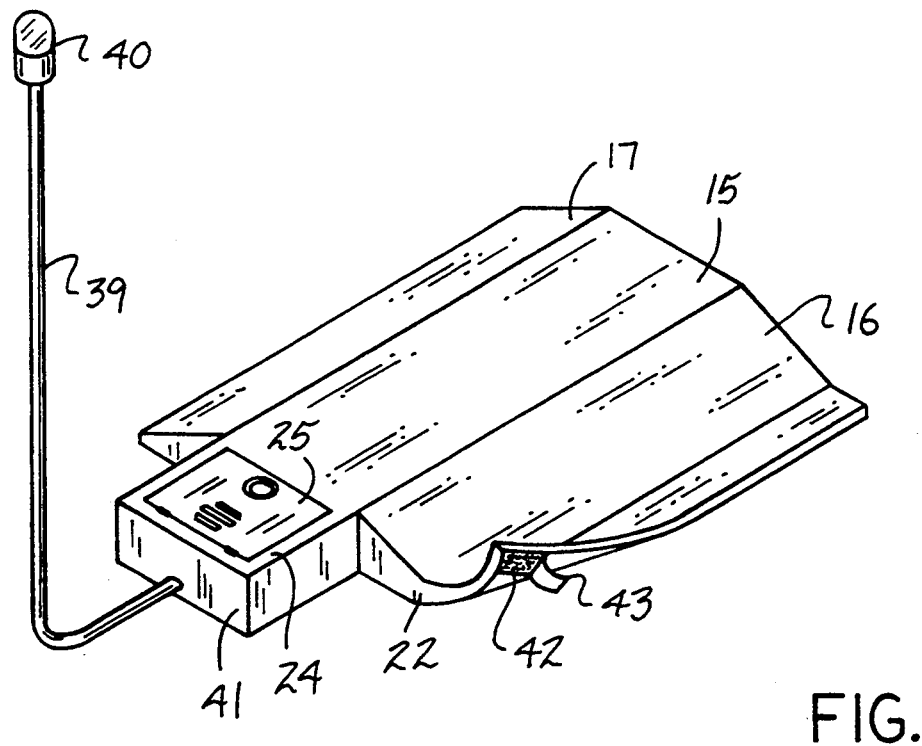
FIG. 7 is an isometric illustration of the invention employing an adhesive securement strip portion mounted to the housing bottom wall.
Figure 8:
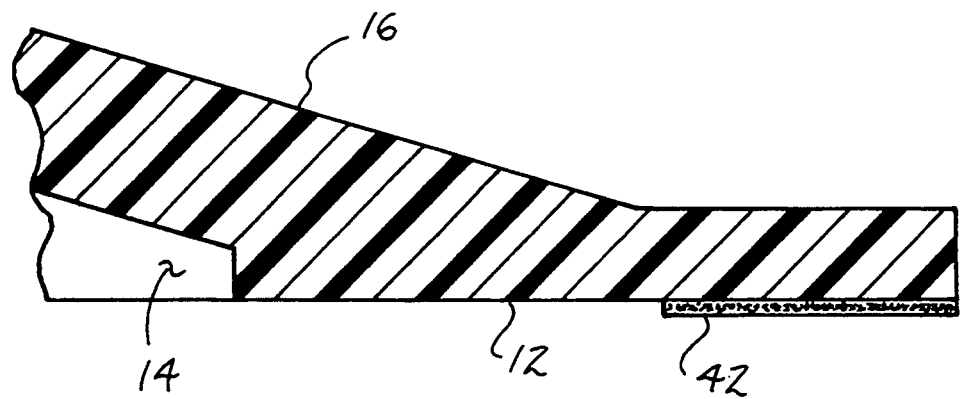
FIG. 8 is an orthographic view of the bottom wall and associated adhesive strip portion.

The FIGS. 7 and 8 indicate further use of an adhesive strip 41 mounted to the housing bottom wall 12 in adjacency to the bottom wall intersection with the first top wall ramp 16, with an adhesive strip 42 including a peel-away layer 43 such that removal of the peel-away layer 43 exposes the adhesive strip 42 for securement to an underlying support surface.

Figure 9:
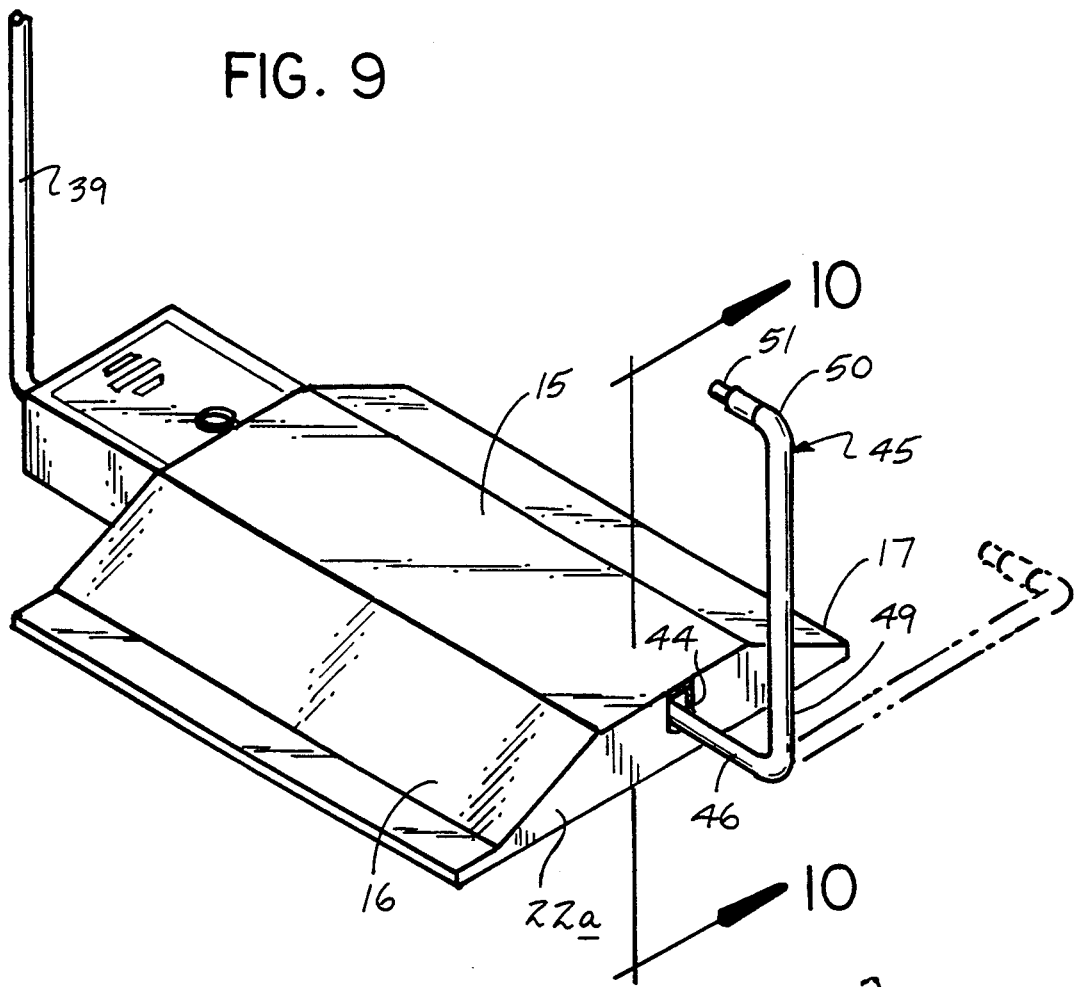
FIG. 9 is an isometric illustration of the invention employing a tire marker indicator structure.
Figure 10:
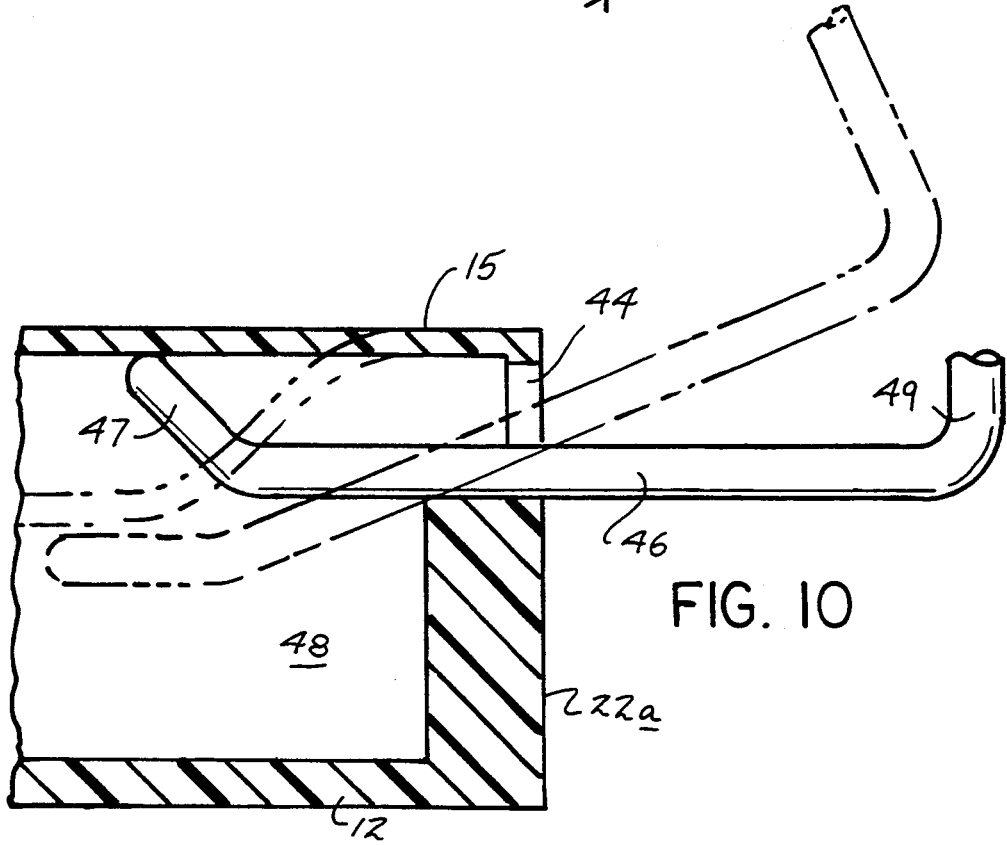
FIG. 10 is an orthographic view, taken along the lines 10—10 of FIG. 9 in the direction indicated by the arrows.

As indicated in FIG. 9, the housing second side wall 22a spaced from the side wall 22 includes a second side wall opening 44 directed into the second side wall 22a in adjacency to the central top wall 15. The second side wall opening 44 accesses an indicator arm cavity 48 within the housing 11 between the central top wall 15 and the bottom wall 12. Arranged for pivotal mounting through the second side wall opening 44 is an indicator arm 45 of a generally C-shaped configuration, having a first leg 46 rotatably mounted and orthogonally oriented relative to the second side wall 22a. The first leg 46 includes a second leg 47 fixedly mounted at an obtuse included angle relative to a first end of the first leg 46 and received within the indicator arm cavity 48 for abutment with a bottom surface of the central top wall 15 when the indicator arm has its third leg 49 orthogonally oriented relative to the central top wall 15. The third leg 49 is integrally and orthogonally mounted to a second end of the first leg 46 to project above the central top wall 15 terminating in a fourth leg 50 orthogonally oriented relative to the third leg 49. The fourth leg 50 includes a marker projection 51 such as chalk, felt marker type, and the like such that subsequent to positioning of the vehicle tire (not shown) upon the central top wall 15, the marker positioner 51 is positioned upon the vehicle tire, whereupon unauthorized removal of the vehicle or displacement therefrom is indicated upon the vehicle tire for visual observation. It should be further noted that the second side wall opening 44 is sized to complementarily receive the first leg 46 therethrough, such that the first leg 46 is arranged for rotative and sliding orientation relative to the second side wall opening 44 to provide for adjustment of the indicator arm 45 for its positioning in engagement with a vehicular tire.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted falling within the scope of the invention.

What is claimed as being new and desired to be protected by Letters Patent of the United States is as follows:

1. A vehicle position alarm apparatus, comprising, a resilient housing, having a housing bottom wall, with a housing central top wall spaced from and parallel the housing bottom wall, and a first top wall ramp extending from a first side of the central top wall canted towards the bottom wall, and a second top wall ramp extending from a second side of the central top wall canted towards the bottom wall, with a bottom wall recess directed into the bottom wall below the central top wall, and the housing further having a housing first side wall spaced from a housing second side wall, with the housing first side wall including a control housing projecting from the first side wall, and an alarm cavity directed into the housing in adjacency to the central top wall, with the alarm cavity including an alarm cavity floor, with the alarm cavity further including an alarm cavity roof below the central top wall, with a first contact plate mounted to the alarm cavity roof, and a second contact plate mounted to the alarm cavity floor in a facing relationship to the first contact plate, wherein the alarm cavity roof is arranged for deflection to permit communication of the first contact plate with the second contact plate upon a vehicle reflecting the central top wall, and a first electrical communication cable in electrical communication with the first contact plate, and a second electrical communication cable directed to the second contact plate, with the first electrical communication cable and the second electrical communication cable directed to the control housing, and alarm means mounted within the control housing for actuation of an audible alarm upon the first contact plate directed into the communication with the second contact plate, and a control housing includes a control housing top wall and a control housing bottom wall, wherein the control housing top wall is coplanar with the central top wall, and the control housing bottom wall is coplanar with the housing bottom wall, and the control housing including control housing side walls spaced from the first side wall, with a control housing cavity directed into the control housing from the control housing top wall, with the control housing top wall having a top wall lid removably mounted relative to the control housing top wall, with the top wall lid including said alarm means mounted thereon, wherein the alarm means includes a battery member and speaker assembly, with the battery member and the speaker assembly arranged in electrical communication with the first contact plate and the second contact plate, with the lid including lid apertures and the speaker assembly mounted to the control housing lid in communication with the lid apertures, and a first contact spring finger mounted to the first cable, and a second spring finger mounted to the second cable, with a third spring finger mounted to the lid and a fourth spring finger mounted to the lid, with the third spring finger and the fourth spring finger arranged for communication with the respective first spring finger and second spring finger upon the lid directed in a coplanar relationship with the control housing top wall, with the third spring finger and the fourth spring finger arranged in electrical communication with the battery member and the speaker assembly.

2. An apparatus as set forth in claim 1 wherein the control housing side wall includes an L-shaped support rod extending therefrom projecting beyond the control housing side wall and extending above the housing top wall, the support rod having an illumination bulb, and the illumination bulb arranged in electrical communication with the alarm means for simultaneous actuation of the illumination bulb upon actuation of said alarm means.

3. An apparatus as set forth in claim 2 including an adhesive strip mounted to the bottom wall in adjacency to the first top wall ramp, with the adhesive strip arranged for securement to an underlying support surface.

4. An apparatus as set forth in claim 3 wherein the second side wall includes a second side wall opening positioned in adjacency to the central top wall, and an indicator arm cavity positioned within the housing in adjacency to the second side wall in communication with the second side wall opening, and an indicator arm of a generally C-shaped configuration, having a first leg slidably and rotatably mounted through the second side wall opening, with the first leg having a first leg first end, with a second leg integrally mounted to the first leg first end at an obtuse included angle therebetween for abutment with the central top wall within the indicator arm cavity, and the first leg having a first leg second end, with a third leg integrally and orthogonally mounted to the first leg second end, with the third leg orthogonally oriented relative to the central top wall when the second leg is in abutment with the central top wall, and a fourth leg integrally and orthogonally mounted to the third leg extending to the second side wall, with the fourth leg having a marker projection mounted in a longitudinally aligned relationship thereto for imparting a mark upon a vehicular tire mounted upon the central top wall.

* * * * *